United States Patent
Iikura

(10) Patent No.: US 9,028,384 B2
(45) Date of Patent: May 12, 2015

(54) ROTATING BODY AND BEARING

(75) Inventor: Kazuaki Iikura, Kanagawa (JP)

(73) Assignee: Fuji Xerox Co., Ltd., Tokyo (JP)

(*) Notice: Subject to any disclaimer, the term of this patent is extended or adjusted under 35 U.S.C. 154(b) by 195 days.

(21) Appl. No.: 13/569,390

(22) Filed: Aug. 8, 2012

(65) Prior Publication Data

US 2013/0260974 A1    Oct. 3, 2013

(30) Foreign Application Priority Data

Mar. 30, 2012  (JP) .................................. 2012-081663

(51) Int. Cl.
| | |
|---|---|
| *F16C 13/00* | (2006.01) |
| *F16C 35/00* | (2006.01) |
| *B29C 45/14* | (2006.01) |
| *B29B 13/00* | (2006.01) |
| *F16C 13/02* | (2006.01) |
| *F16C 33/12* | (2006.01) |
| *G03G 15/08* | (2006.01) |

(52) U.S. Cl.
CPC ............ *G03G 15/0813* (2013.01); *F16C 13/02* (2013.01); *F16C 33/128* (2013.01)

(58) Field of Classification Search
CPC ........ F16C 13/02; F16C 13/022; F16C 13/04; G03G 15/757; B29L 2031/04; B29C 45/1459
USPC ..................... 492/47, 16, 18; 264/271.1, 279; 384/440, 441
See application file for complete search history.

(56) References Cited

U.S. PATENT DOCUMENTS

| | | | | | |
|---|---|---|---|---|---|
| 5,815,773 | A | * | 9/1998 | Zaman .......................... | 399/117 |
| 6,152,603 | A | * | 11/2000 | Iwasaki ......................... | 384/428 |
| 6,795,669 | B2 | * | 9/2004 | Yamauchi et al. ............. | 399/159 |
| 7,491,161 | B2 | * | 2/2009 | Taguchi .......................... | 492/47 |
| 2012/0021882 | A1 | * | 1/2012 | Reiner ........................... | 492/47 |
| 2013/0040794 | A1 | * | 2/2013 | Paoletti .......................... | 492/47 |
| 2013/0259545 | A1 | * | 10/2013 | Hata ............................. | 399/328 |

(Continued)

FOREIGN PATENT DOCUMENTS

| | | | | |
|---|---|---|---|---|
| EP | 2472145 | A1 * | 7/2012 | ............. F16H 55/06 |
| JP | 09-325569 | A | 12/1997 | |
| JP | 10-247018 | A | 9/1998 | |

(Continued)

OTHER PUBLICATIONS

English machine translation of JP 2003-343546.*

(Continued)

*Primary Examiner* — Essama Omgba
(74) *Attorney, Agent, or Firm* — Sughrue Mion, PLLC

(57) ABSTRACT

A rotating body includes a cylindrical rotating member and bearings located at the ends located in the axial direction of the rotating member. In the rotating body, at least one of the bearings includes a metal inner ring portion having a bearing hole and a resin outer ring portion having first and second portions. The first portion is fitted into the rotating member. The second portion protrudes in the axial direction from the rotating member, surrounds the outer peripheral surface of the inner ring portion, has an outer diameter larger than that of the rotating member, and is in contact with an opposing object opposing the rotating member so as to maintain a specified size of a gap by which the rotating member and the opposing object are spaced apart from each other. The outer and inner ring portions are integrally molded.

11 Claims, 9 Drawing Sheets

(56) References Cited

U.S. PATENT DOCUMENTS

| | | | |
|---|---|---|---|
| 2014/0140728 A1* | 5/2014 | Huang et al. | 399/167 |
| 2014/0212174 A1* | 7/2014 | Hayashi | 399/159 |

FOREIGN PATENT DOCUMENTS

| | | | | |
|---|---|---|---|---|
| JP | 2001-249507 A | | 9/2001 | |
| JP | 2002229173 A | * | 8/2002 | G03D 3/08 |
| JP | 2002-295471 A | | 10/2002 | |
| JP | 2003301834 A | * | 10/2003 | F16C 17/02 |
| JP | 2003-343546 A | | 12/2003 | |
| JP | 2004279609 A | * | 10/2004 | G03G 15/08 |
| JP | 2010032059 A | * | 2/2010 | F16C 33/20 |

OTHER PUBLICATIONS

English machine translation of JP 2003-301834.*
Japanese Office Action issued Sep. 13, 2012 in corresponding Japanese Patent Application No. 2012-081663.

* cited by examiner

ROTATING BODY AND BEARING

CROSS-REFERENCE TO RELATED APPLICATIONS

This application is based on and claims priority under 35 USC 119 from Japanese Patent Application No. 2012-081663 filed Mar. 30, 2012.

BACKGROUND (i) Technical Field

The present invention relates to a rotating body and a bearing.

(ii) Related Art

In image forming apparatuses such as electrophotographic copiers and laser beam printers, an electrostatic latent image is formed on a photoconductor drum (an example of an image carrying body and an example of an opposing object), and the electrostatic latent image is developed by supplying, for example, a magnetic two-component toner (an example of a developer) using a developing roller (an example of a rotating body), thereby rendering the electrostatic latent image visible as a toner image (an example of a developed image).

In an image forming apparatus having such a structure, it is required that the precision of a small gap between the photoconductor drum and the developing roller be maintained.

Maintaining the precision of a gap between a rotating body and an opposing object is required not only in the case of the gap between the photoconductor drum and the developing roller of the image forming apparatus but also for a variety of devices.

SUMMARY

A rotating body according to an aspect of the present invention includes a cylindrical rotating member having ends in an axial direction of the rotating member and bearings located at the ends located in the axial direction. In the rotating body, at least one of the bearings includes a metal inner ring portion having an outer peripheral surface and a bearing hole formed in the inner ring portion and a resin outer ring portion having a first portion and a second portion. The first portion is fitted into the rotating member. The second portion protrudes in the axial direction from the rotating member, surrounds the outer peripheral surface of the inner ring portion, has an outer diameter larger than an outer diameter of the rotating member, and is in contact with an opposing object disposed opposite the rotating member so as to maintain a specified size of a gap by which the rotating member and the opposing object are spaced apart from each other. The outer ring portion and the inner ring portion are integrally molded.

BRIEF DESCRIPTION OF THE DRAWINGS

Exemplary embodiment of the present invention will be described in detail based on the following figure, wherein.

DETAILED DESCRIPTION

Figure 1:
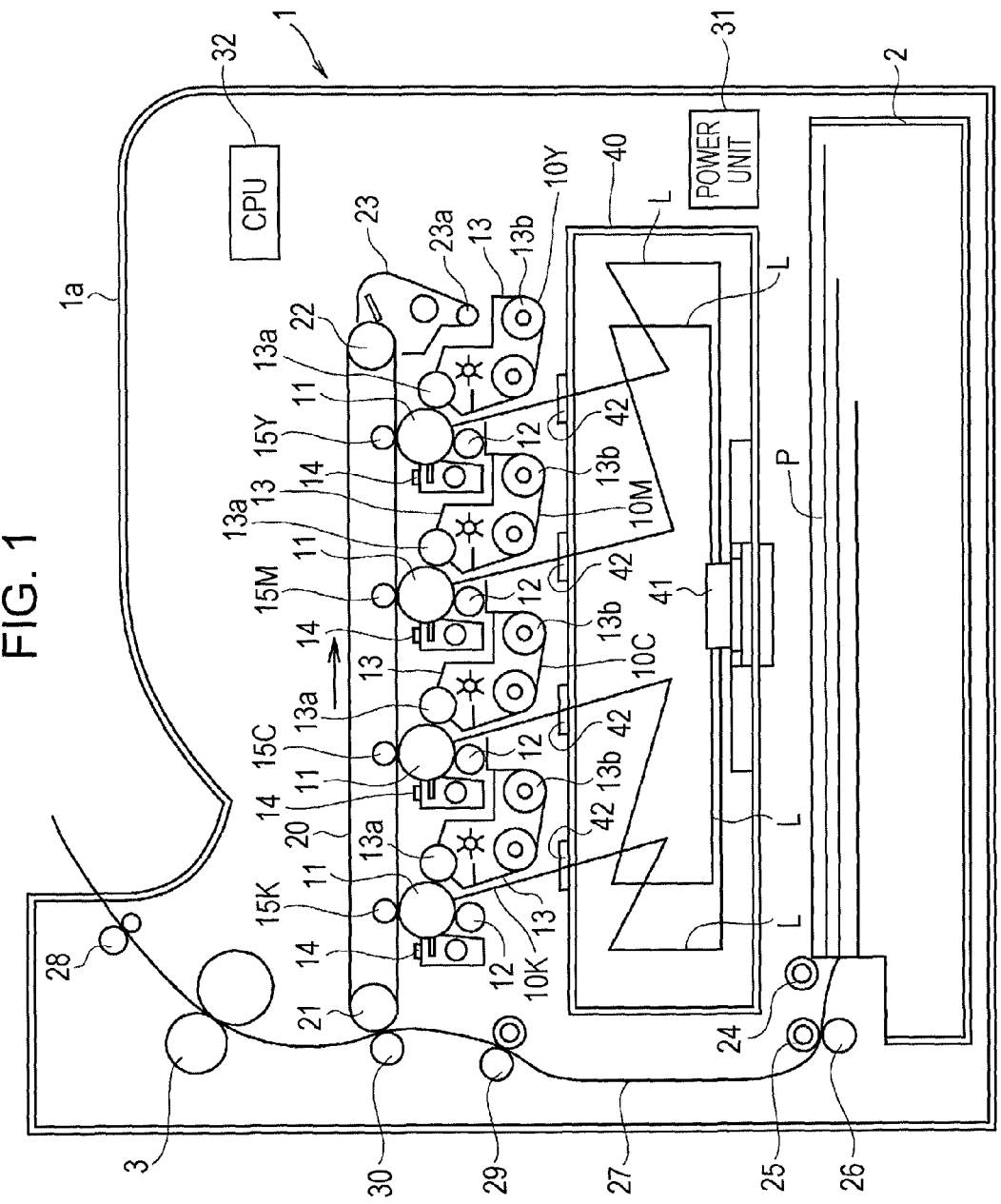
FIG. 1 is an outline structural view of a color laser beam printer according to a first exemplary embodiment of the present invention.

An exemplary embodiment as an example of the present invention will be described in detail below with reference to the drawings. In the drawings referred to in the description of the exemplary embodiment, the same elements are generally denoted by the same reference numerals and redundant explanations thereof are omitted.

First Exemplary Embodiment

Figure 2:
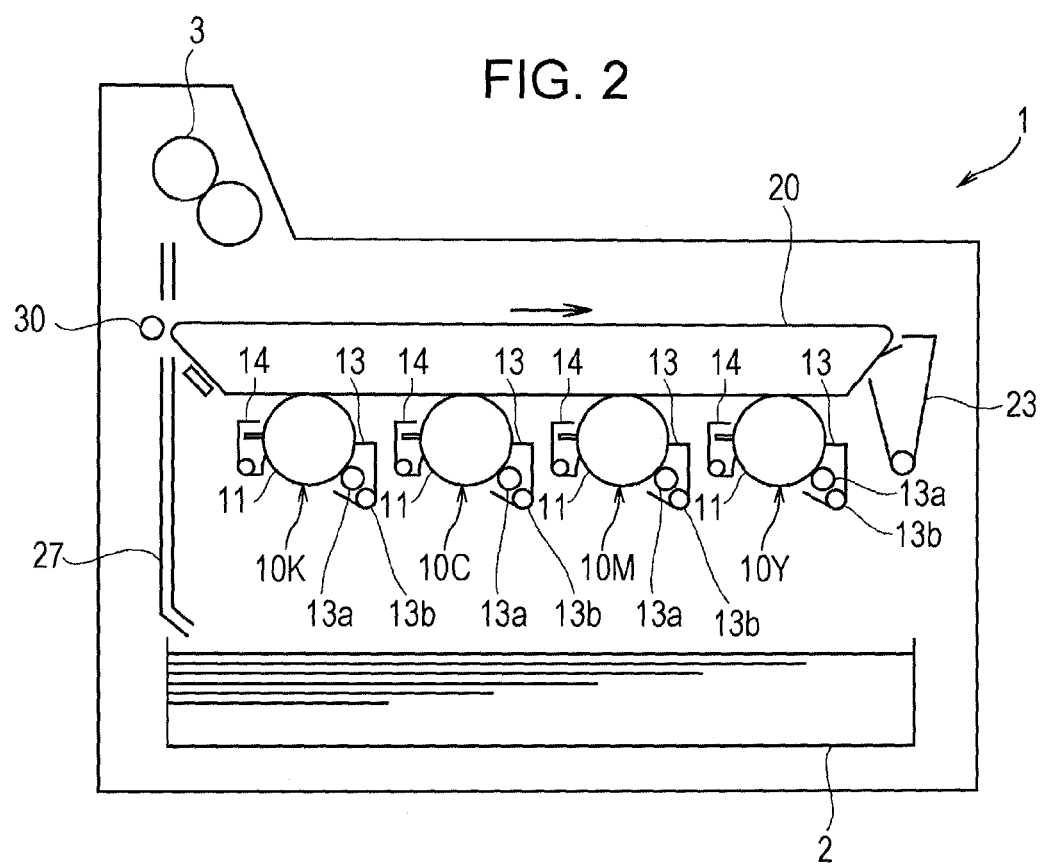
FIG. 2 is a simplified view of the color laser beam printer illustrated in FIG. 1.

FIG. 1 is an outline structural view of a color laser beam printer according to a first exemplary embodiment of the present invention. FIG. 2 is a simplified view of the color laser beam printer illustrated in FIG. 1.

As illustrated in FIGS. 1 and 2, a tandem color laser beam printer 1 (an example of an image forming apparatus) includes four image forming engines 10Y, 10M, 100, and 10K that are respectively used to form toner images in yellow, magenta, cyan, and black. The color laser beam printer 1 also includes an intermediate transfer belt 20 that transports the toner images (examples of developed images) transferred from the image forming engines (first transfer). The multiple toner images superposed onto the intermediate transfer belt 20 are further transferred (second transfer) to a sheet of paper P (an example of a recording medium) so as to form a full-color image.

The intermediate transfer belt 20, which is an endless belt, is stretched over a drive roller 22 and a driven roller 21. The intermediate transfer belt 20 receives the toner images, which are formed by the image forming engines 10Y, 10M, 100, and 10K, through the first transfer while rotating in a direction indicated by arrows in FIG. 1 and FIG. 2.

A second transfer roller 30 is provided at a position opposing the driven roller 21 with the intermediate transfer belt 20 therebetween. The second transfer roller 30 and the intermediate transfer belt 20 are in contact with each other so as to press against each other. The sheet of paper P passes through a nip between the second transfer roller 30 and intermediate transfer belt 20, so that the toner images are transferred from the intermediate transfer belt 20 onto the sheet of paper P through the second transfer. At a position opposite the drive roller 22, the drive roller 22 being positioned on a side opposite to the driven roller 21, a belt cleaner 23 for the intermediate transfer belt 20 is arranged. The belt cleaner 23 removes the toner remaining on and adhering to the intermediate transfer belt 20 after the second transfer has been performed from the intermediate transfer belt 20.

The above-described four image forming engines 10Y, 10M, 100, and 10K are arranged parallel to one another below the intermediate transfer belt 20. Toner images formed in accordance with image information about the respective colors are transferred from the image forming engines 10Y, 10M, 100, and 10K onto the intermediate transfer belt 20 through the first transfer. The four image forming engines 10Y, 10M, 100, and 10K are arranged in a direction in which the intermediate transfer belt 20 rotates in the order of colors, that is, yellow, magenta, cyan, and black. Since black is a color that is generally most frequently used, the image forming engine 10K for black out of the image forming engines 10Y, 10M, 100, and 10K is arranged closest to a second transfer position.

A raster scanning unit 40 is provided below the image forming engines 10Y, 10M, 100, and 10K. The raster scanning unit 40 emits light in accordance with image information toward a photoconductor drum 11 (an example of an image carrying body and an example of an opposing object) provided in each of the image forming engines 10Y, 10M, 10C, and 10K. The raster scanning unit 40 is shared among all the image forming engines 10Y, 10M, 10C, and 10K. The raster scanning unit 40 includes four semiconductor laser units (not shown) and a polygon mirror 41. The semiconductor laser units emit laser beams L modulated in accordance with image information of the respective colors. The polygon mirror 41 rotates at high speed so as to scan the four laser beams L in the axial directions of the photoconductor drums 11. The laser beams scanned by the polygon mirror 41 travel in predetermined paths while being reflected by mirrors (not shown). After that, the photoconductor drums 11 of the image forming engines 10Y, 10M, 10C, and 10K are exposed to the laser beams L through scanning windows 42 provided in upper portions of the raster scanning unit 40.

The image forming engines 10Y, 10M, 10C, and 10K each include the photoconductor drum 11, a charging roller 12, a developing unit 13, and a drum cleaner 14 so as to form a toner image in accordance with image information in a corresponding color on the photoconductor drum 11. The photoconductor drum 11 includes a cylindrical base member made of metal such as aluminum and a photosensitive layer formed on the base member. The charging roller 12 charges a surface of the photoconductor drum 11 at a specified potential. The developing unit 13 develops an electrostatic latent image (supplies toner to the electrostatic latent image), which is formed on the photoconductor drum 11 by exposure of the laser beam L, so as to form the toner image (render the electrostatic latent image visible). The drum cleaner 14 removes remaining toner and paper dust from the surface of the photoconductor drum 11 after the toner image has been transferred to the intermediate transfer belt 20.

The color laser beam printer 1 according to the present exemplary embodiment includes the developing units 13 that use two-component developer including a mixture of a toner and carrier.

Each developing unit 13 includes a developing roller 13a (an example of a rotating body) spaced apart from a corresponding one of the photoconductor drums 11 by a small gap therebetween. The developing roller 13a supplies the developer to the electrostatic latent image formed on the photoconductor drum 11. The developing unit 13 also includes transport shafts 13b. The transport shafts 13b each have a spiral blade, the spiral blade being similar to that of a transport shaft 23a, that transports the developer toward the developing roller 13a. New toner, with which the developing unit 13 is replenished, is supplied from a rear side (rear side of the sheet of FIG. 1) of the transport shafts 13b. The details of the developing roller 13a will be described later.

First transfer rollers 15Y, 15M, 15C, and 15K are provided at positions respectively opposing the photoconductor drums 11 of the image forming engines 10Y, 10M, 100, and 10K so as to nip the intermediate transfer belt 20 therebetween. When a transfer bias voltage is applied to the first transfer roller 15Y, 15M, 15C, or 15K, an electric field is formed between a corresponding one of the photoconductor drums 11 and the one of the first transfer rollers 15Y, 15M, 15C, and 15K to which the transfer bias voltage is applied. This causes the toner image, which is electrically charged on the photoconductor drum 11 and held by the photoconductor drum 11, to be transferred onto the intermediate transfer belt 20 by the Coulomb force.

The sheet of paper P is transported from a sheet feeding cassette 2, which is housed in a lower portion of the color laser beam printer 1 to the interior of a housing. Specifically, the sheet of paper P is transported to the second transfer position, at which the intermediate transfer belt 20 and the second transfer roller 30 are in contact with each other. The sheet feeding cassette 2 is pushed into the color laser beam printer 1 from the front side of the color laser beam printer 1 so as to be set in the color laser beam printer 1. A sheet pickup roller 24 and a sheet feeding roller 25 are provided above the sheet feeding cassette 2 set in the color laser beam printer 1. The sheet pickup roller 24 and the sheet feeding roller 25 pick up the sheet of paper P loaded in the sheet feeding cassette 2. A retard roller 26 is provided at a position opposing the sheet feeding roller 25. The retard roller 26 prevents multiple feeding of the sheets of paper P.

The color laser beam printer 1 has a transport path 27 therein for a sheet of paper P along a left side surface of the color laser beam printer 1 in a vertical direction. The sheet of paper P picked up from the sheet feeding cassette 2 positioned at a bottom of the color laser beam printer 1 is moved upward through the transport path 27, introduced to the second transfer position at an entering timing controlled by a registration roller 29, and undergoes toner image transference thereto at the second transfer position. After that, the sheet of paper P is transported to a fixing unit 3 provided above the second transfer position. The sheet of paper P, onto which the toner image has been fixed by the fixing unit 3, is ejected to a paper output tray 1a formed in an upper surface of the color laser beam printer 1 by an output roller 28 with the image formed surface thereof facing down.

Such a color laser beam printer 1 includes a power unit 31. The power unit 31 is used to, for example, supply power to motors (not shown) that drive the above-described rotating elements (for example, the photoconductor drums 11, the drive roller 22, and so forth) and apply transfer biases to the first transfer rollers 15Y, 15M, 15C, and 15K, and the second transfer roller 30.

Furthermore, the color laser beam printer 1 includes a central processing unit (CPU) 32 (an example of a controller) that controls operations of devices, units, and the like involved in image formation in the color laser beam printer 1.

In order to form a full-color image using the color laser beam printer 1 having such a structure, the raster scanning unit 40 initially emits light toward the photoconductor drums 11 of the image forming engines 10Y, 10M, 10C, and 10K in accordance with image information of the respective colors at a predetermined timing. By doing this, electrostatic latent images according to the image information are formed on the photoconductor drums 11 of the image forming engines 10Y, 10M, 10C, and 10K. By supplying toner to these electrostatic latent images, toner images are formed.

The toner images formed on the photoconductor drums 11 of the image forming engines 10Y, 10M, 10C, and 10K are sequentially transferred onto the rotating intermediate transfer belt 20. Thus, multiple toner images made of the toner images in the respective colors having been superposed on the intermediate transfer belt 20 are formed. The sheet of paper P is fed from the sheet feeding cassette 2 and caused to pass through the nip between the second transfer roller 30 and the intermediate transfer belt 20 at a timing at which the toner image transferred onto the intermediate transfer belt 20 through the first transfer reaches the second transfer position. Thus, the multiple toner images on the intermediate transfer belt 20 are transferred to the sheet of paper P through second transfer. The multiple toner images having been transferred onto the sheet of paper P through the second transfer are fixed by the fixing unit 3. Thus, a full-color image is completed on the sheet of paper P.

The developing rollers 13a provided in the developing units 13 will be described.

Figure 3:
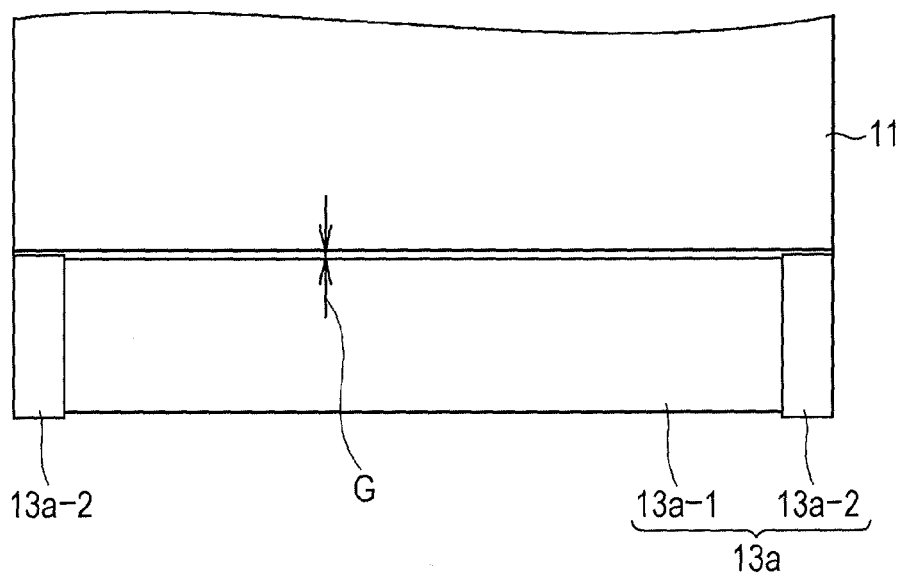
FIG. 3 illustrates the relationship between a photoconductor drum and a developing roller of the color laser beam printer illustrated in FIG. 1.

As illustrated in FIG. 3, the developing rollers 13a as the rotating bodies are disposed such that a small gap G is formed between each developing roller 13a and a corresponding one of the photoconductor drums 11. Here, the small gap G is specifically formed to have such a size that the developer held by the developing roller 13a by magnetic force is attracted to the photoconductor drum 11 by electrostatic force.

In order to maintain such a small gap G, as illustrated in FIG. 3, each developing roller 13a has bearings 13a-2, which is attached to both ends of a sleeve 13a-1 (an example of a rotating member), the ends being located in the axial direction. The sleeve 13a-1, which is a roller body, is formed of a cylindrical electrically conductive metal material. The bearings 13a-2 each have an outer diameter slightly larger than that of the sleeve 13a-1 (each bearing 13a-2 has a radius larger than that of the sleeve 13a-1 by a length corresponding to the size of the gap G). Through contact of the bearings 13a-2 with the photoconductor drum 11 during rotation of the bearings 13a-2 and the photoconductor drum 11, the gap G is maintained between the developing roller 13a and the photoconductor drum 11 (more specifically, between the sleeve 13a-1 of the developing roller 13a and the photoconductor drum 11).

Figure 4:
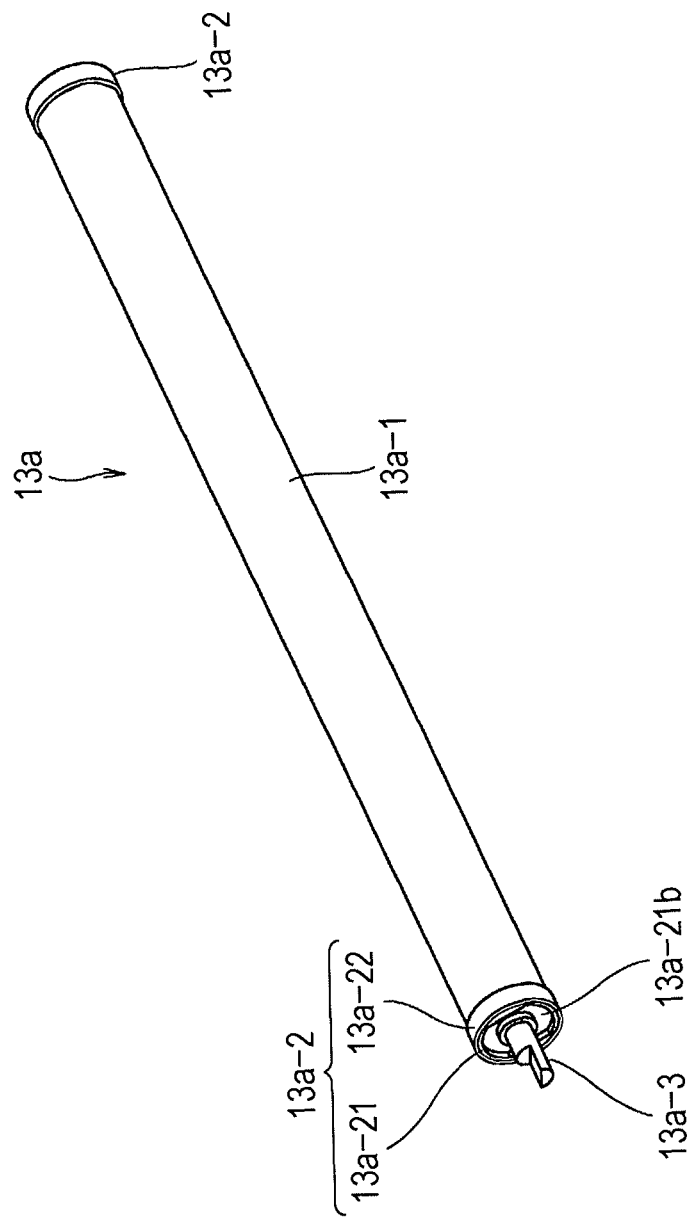
FIG. 4 is a perspective view of the developing roller used in the color laser beam printer illustrated in FIG. 1.
Figure 5:
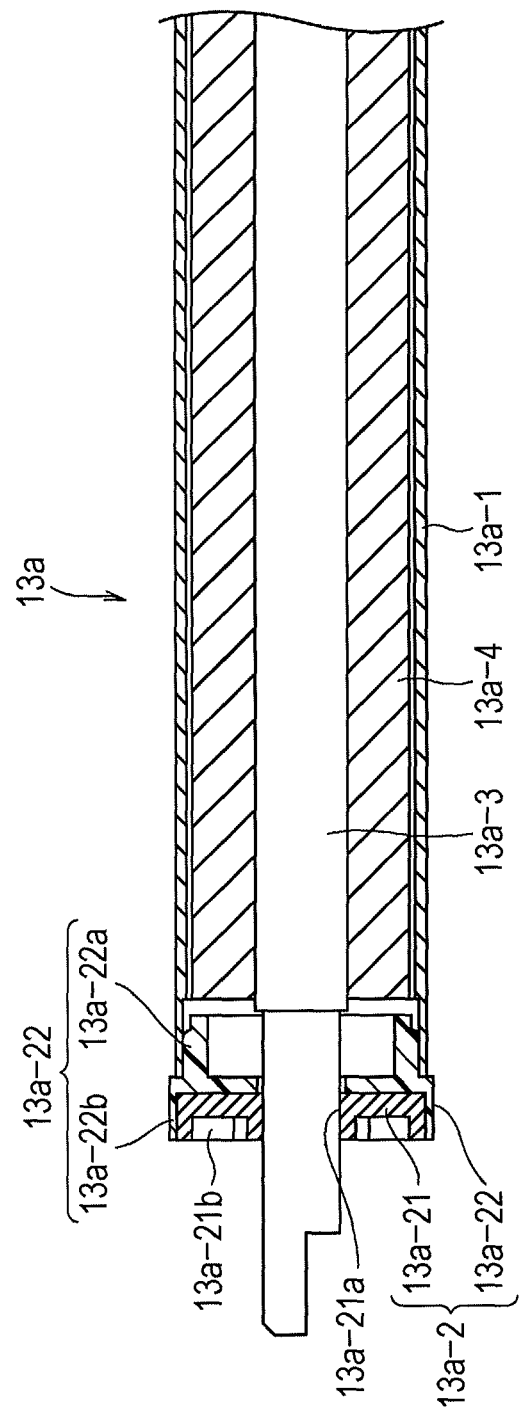
FIG. 5 is a sectional view of part of the developing roller illustrated in FIG. 4 taken in the axial direction.

As illustrated in FIGS. 4 and 5, each developing roller 13a includes a metal shaft 13a-3 and a cylindrical magnet 13a-4 secured around the shaft 13a-3. The magnet 13a-4 is surrounded by the sleeve 13a-1 with a gap therebetween. The aforementioned bearings 13a-2 are each located at a corresponding end of the sleeve 13a-1. The shaft 13a-3 is rotatably held by the bearings 13a-2.

Figure 6:
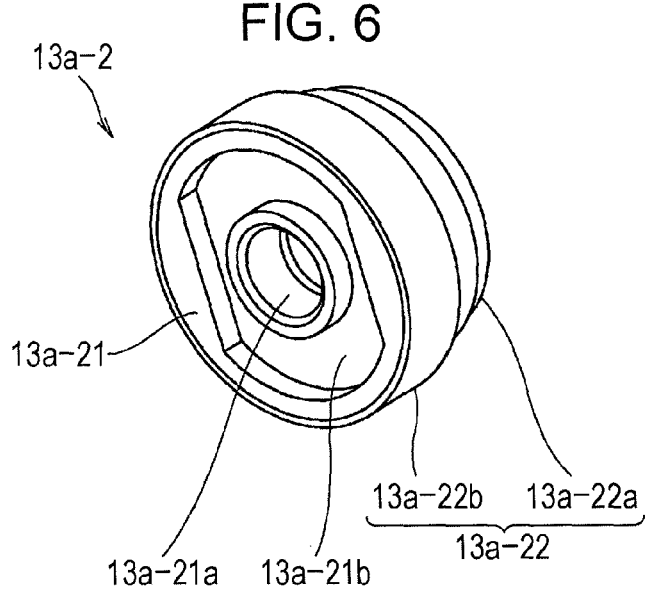
FIG. 6 is a perspective view of a bearing of the developing roller illustrated in FIG. 4.
Figure 7:
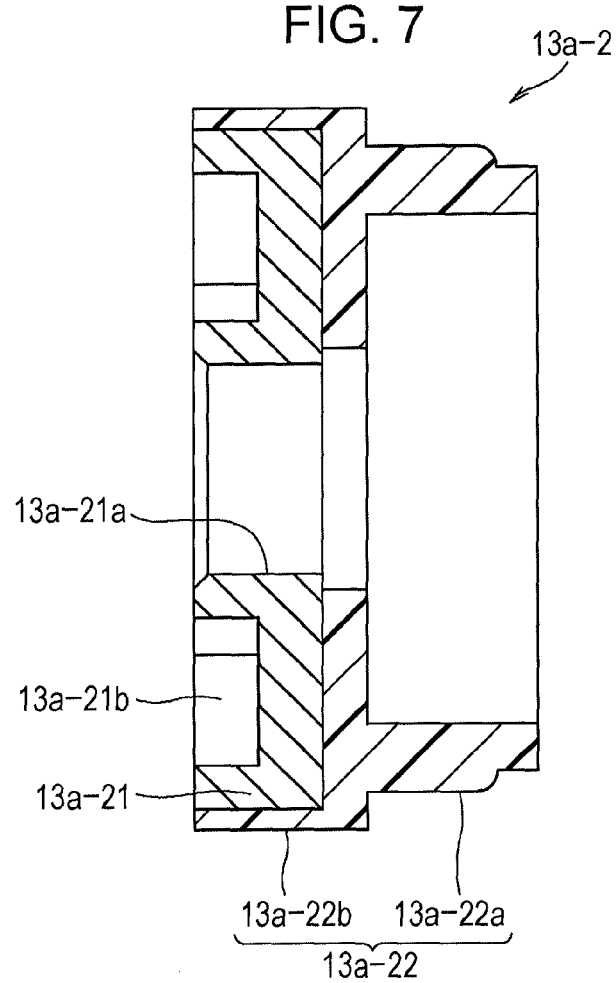
FIG. 7 is a sectional view of the bearing illustrated in FIG. 6 taken in the axial direction.

As illustrated in FIGS. 6 and 7, each bearing 13a-2 has an annular inner ring portion 13a-21 and an annular outer ring portion 13a-22. The inner ring portion 13a-21 is formed of a sintered metal material (made by compression-molding and heating copper, steel or other metal impalpable powder, so that metal particles are diffusion-bonded at a temperature equal to or lower than the melting point) and has a bearing hole 13a-21a formed therein, which is located near the rotation center of the developing roller 13a and holds the shaft 13a-3 such that the shaft 13a-3 is rotatable relative to the bearing hole 13a-21a. The outer ring portion 13a-22 is formed of resin and located away from the rotation center of the developing roller 13a. The inner ring portion 13a-21 and the outer ring portion 13a-22 are integrated with each other with the inner ring portion 13a-21 insert-molded into the outer ring portion 13a-22.

The inner ring portion 13a-21 has a coupling portion 13a-21b extending outward in the axial direction so as to surround the bearing hole 13a-21a. The coupling portion 13a-21b is defined by an elliptical recessed hole having linear portions that oppose each other. By fitting an output shaft, which transmits output from the motor (not shown), into the coupling portion 13a-21b such that the output shaft and the developing roller 13a are coaxial with each other, the output shaft is connected to the developing roller 13a. Thus, the developing roller is set to be driven for rotation.

The inner ring portion 13a-21 is not necessarily formed of a sintered metal material. It is sufficient that the inner ring portions 13a-21 be made of metal. However, since use of a sintered metal material as the material of the inner ring portion 13a-21 helps increase the dimensional precision of the inner ring portion 13a-21, the inner ring portion 13a-21 may be formed of a sintered metal material.

Insert molding is a manufacturing technique in which an insert (here, the inner ring portion 13a-21) to be embedded is set in a mold, and after that, resin is injected into a molding machine. The melted resin is solidified with the insert encased therein so as to form an integrated component into which the resin (here, the outer ring portion 13a-22) and the insert are integrated.

The outer ring portion 13a-22 has a first portion 13a-22a and a second portion 13a-22b. The first portion 13a-22a is fitted into the sleeve 13a-1. The second portion 13a-22b protrudes in the axial direction from the sleeve 13a-1. As illustrated in FIG. 5, the second portion 13a-22b surrounds an outer peripheral surface of the inner ring portion 13a-21 and has an outer diameter larger than that of the sleeve 13a-1. Here, the difference between the radii of the outer diameters of the second portion 13a-22b and the sleeve 13a-1 corresponds to the difference between the radius of sleeve 13a-1 and the aforementioned radius larger than the radius of the sleeve 13a-1 by the size of the gap G.

Thus, through contact of the second portions 13a-22b of the developing roller 13a with the photoconductor drum 11, which is the opposing object that opposes the sleeve 13a-1, the sleeve 13a-1 and the photoconductor drum 11 are spaced apart from each other by a specified size of a gap.

Here, a developing roller 113a, which is a comparative example studied by the inventor, will be described.

Figure 8:
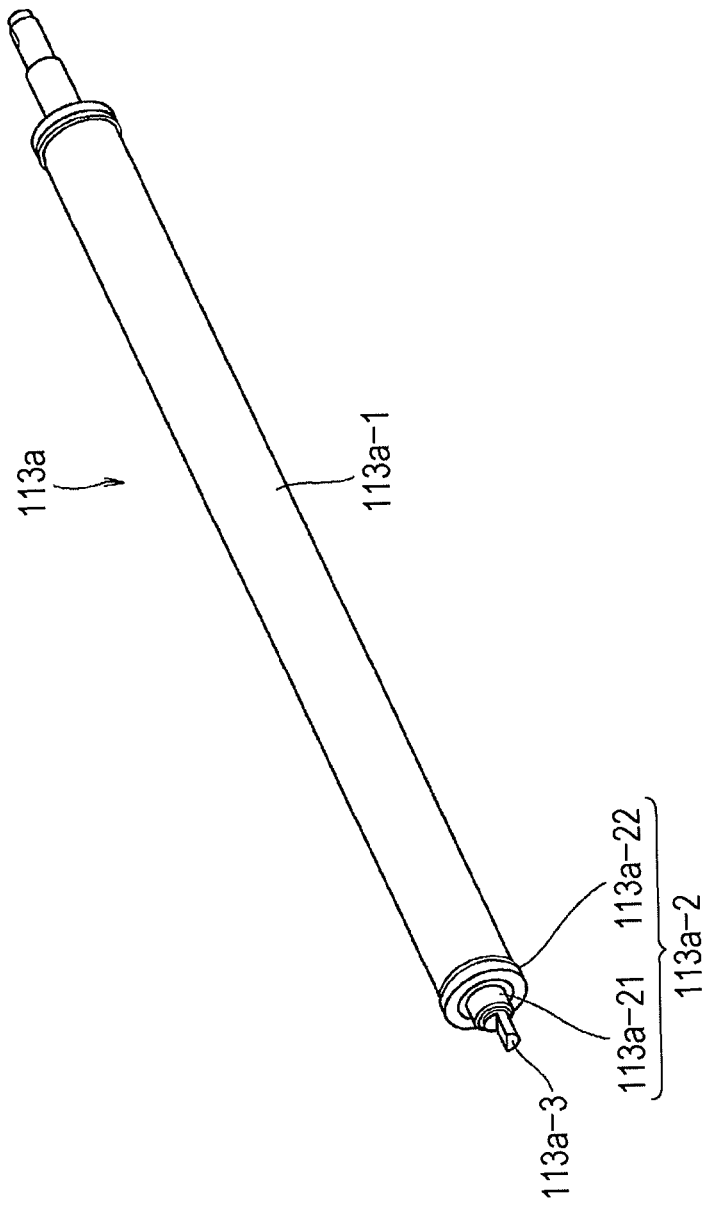
FIG. 8 is a perspective view of a developing roller as a comparative example.
Figure 9:
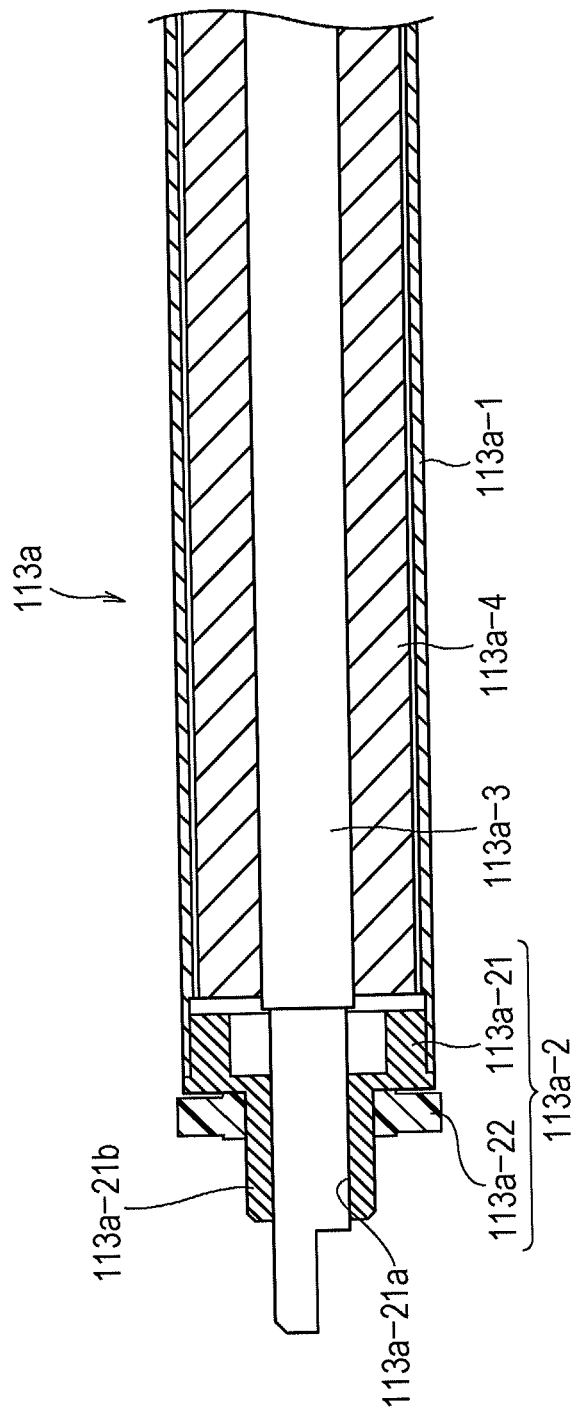
FIG. 9 is a sectional view of part of the developing roller illustrated in FIG. 8 taken in the axial direction.

As illustrated in FIGS. 8 and 9, the developing roller 113a as the comparative example also includes a metal shaft 113a-3 and a cylindrical magnet 113a-4 secured around the shaft 113a-3. The magnet 113a-4 is surrounded by a sleeve 113a-1 with a gap therebetween. Bearings 113a-2 are each located at a corresponding end of the sleeve 113a-1. The shaft 113a-3 is rotatably held by the bearings 113a-2.

Each bearing 113a-2 has a metal bearing body portion 113a-21, which is fitted into the sleeve 113a-1 and has a bearing hole 113a-21a formed therein, by which the shaft 113a-3 is rotatably held. The bearing body portion 113a-21 also has a protruding portion 113a-21b formed therein, which extends outward in the axial direction of the sleeve 113a-1 so as to be coaxial with the shaft 113a-3. The bearing 13a-2 has a ring-shaped tracking roller 113a-22, which is formed of resin and fitted into the protruding portion 113a-21b of the bearing body portion 113a-21. An outer diameter of the tracking roller 113a-22 is larger than that of the sleeve 113a-1. The tracking roller 113a-22 is rotatably attached to the bearing body portion 113a-21.

Precision of a small gap between the outer peripheral surface of the photoconductor drum 11 and an outer peripheral surface of the developing roller 113a (the gap similar to the gap G in FIG. 3) depends on precision of the difference between the outer diameter of the tracking roller 113a-22, which is in contact with the photoconductor drum 11, and an outer diameter of the protruding portion 113a-21b of the bearing body portion 113a-21, precision of an outer diameter of the bearing body portion 113a-21, and precision of the outer diameter of the sleeve 113a-1. In order to maintain the precision of the above-described small gap, it is required these dimensions be highly precisely maintained.

However, the tracking roller 113a-22, which is formed by molding resin by injection molding, usually has depression, which is a phenomenon caused by shrinkage occurring when a molded product is cooled. Because of this, it is difficult to maintain dimensional precision and such a tracking roller 113a-22 may cause a quality problem in that preset dimensions are not obtained.

Furthermore, since the bearing body portion 113a-21 and the tracking roller 113a-22 are separately formed, the tracking roller 113a-22 and the protruding portion 113a-21b slide on each other. This may lead to wear of the tracking roller 113a-22 and changes in dimensions of the tracking roller 113a-22 over time.

In contrast, according to the present exemplary embodiment, the inner ring portion 13a-21 is insert-molded into the outer ring portion 13a-22, and the second portion 13a-22b of the outer ring portion 13a-22 surrounds the outer peripheral surface of the inner ring portion 13a-21, which is formed of a sintered metal material having high dimensional precision. This may allow the thickness of the second portion 13a-22b of the outer ring portion 13a-22, which is formed of resin, to be decreased (for example, to 1 mm or smaller). This may eliminate most of the effects of depression that molded resin usually undergoes, and accordingly, may maintain highly precise dimensions and suppress changes in dimensions.

Since the outer ring portion 13a-22 and the inner ring portion 13a-21 are integrated with each other with the inner ring portion 13a-21 insert-molded into the outer ring portion 13a-22, the outer ring portion 13a-22 and the inner ring portion 13a-21 do not slide on each other, and accordingly, wear of the outer ring portion 13a-22 is suppressed. This maintains the small gap, which is stable over time, between the outer ring portion 13a-22 and the photoconductor drum 11.

Accordingly, with the developing roller 13a according to the present exemplary embodiment as an example of the rotating body, the precision of the gap G (see FIG. 3) between the developing roller 13a and the photoconductor drum 11 as the opposing object is maintained.

In the developing roller 13a according to the present exemplary embodiment having the sleeve 13a-1 as the rotating member, the sleeve 13a-1 being formed of electrically conductive metal, the outer ring portion 13a-22 may be formed of electrically conductive resin. By doing this, power is supplied from the inner ring portion 13a-21 formed of the electrically conductive sintered metal material to the sleeve 13a-1 through the outer ring portion 13a-22 instead of preparing a separate power supply path to the sleeve 13a-1.

In this case, the inner ring portion 13a-21 may be formed of a non-oil impregnated sintered metal material that is a sintered metal material not impregnated with oil. In the case where the inner ring portion 13a-21 is formed of the non-oil impregnated sintered metal material, effects of an oil layer on electrical conductivity are suppressed.

Second Exemplary Embodiment

Figure 10:
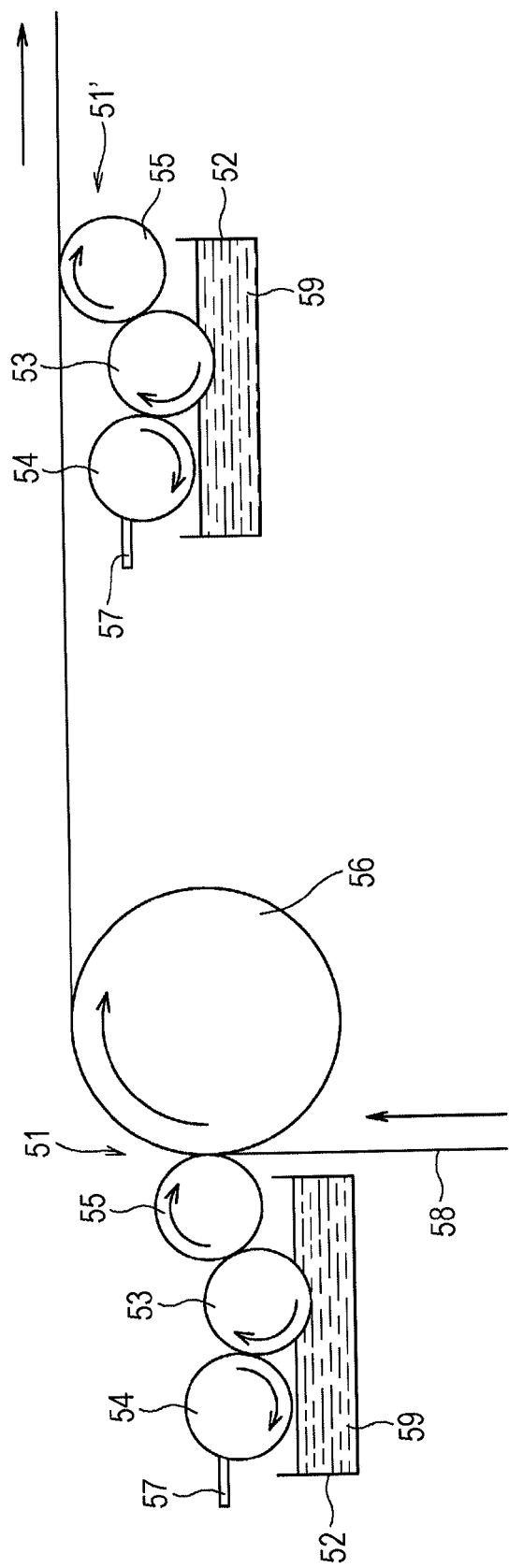
FIG. 10 is an outline structural view of roll coaters according to a second exemplary embodiment of the present invention.

FIG. 10 is an outline structural view of roll coaters according to a second exemplary embodiment of the present invention.

Roll coaters 51 and 51' illustrated in FIG. 10 are used in continuous coating in which a continuously running metal strip 58 such as, for example, a steel strip, is coated with coating materials.

The roll coater 51 includes a coating material pan 52, four rollers 53, 54, 55, and 56, and a doctor blade 57. A coating material 59 is stored in the coating material pan 52. The rollers 53, 54, 55, and 56 are arranged side by side such that rotation axes thereof are parallel to one another. The roll coater 51' includes the same components as the roll coater 51 except that the roll coater 51' does not include the roller 56.

The four rollers 53 to 56 include a material pickup roller 53, a metering roller 54, an applicator roller 55, and a backup roller 56. The material pickup roller 53 draws up the coating material 59 stored in the coating material pan 52. The metering roller 54 adjusts the amount of the coating material 59 drawn up by the material pickup roller 53. The applicator roller 55 receives the coating material 59 from the material pickup roller 53. The amount of the coating material 59 to be received by the applicator roller 55 is adjusted by the metering roller 54. The backup roller 56 holds the running metal strip 58. The four rollers 53 to 56 rotate such that the adjacent rollers out of the four rollers 53 to 56 rotate in the same rotational direction.

The doctor blade 57 is disposed near the metering roller 54 so as to scrape the coating material 59 fed to the metering roller 54 and return the scraped coating material 59 to the coating material pan 52.

In continuous coating using such a roll coater 51, the coating material 59 stored in the coating material pan 52 of the roll coater 51 is initially drawn up by the material pickup roller 53. The amount of the coating material 59 drawn up by the material pickup roller 53 is adjusted by causing the coating material 59 to pass through a gap G' between the material pickup roller 53 and the metering roller 54. After that, the coating material 59 is fed from the material pickup roller 53 to the applicator roller 55.

The applicator roller 55 applies the coating material 59 fed from the material pickup roller 53 to the metal strip 58 continuously running through a gap between the applicator roller 55 and the backup roller 56. Thus, a coating layer is formed on the metal strip 58.

The coating material 59 fed to the metering roller 54 is scraped by the doctor blade 57 and returned to the coating material pan 52.

Referring to FIG. 10, after the coating layer has been formed on one of surfaces of the metal strip 58 running upward by the roll coater 51 on the left side in FIG. 10, the backup roller 56 causes the metal strip 58 to run in a lateral direction, and a coating layer is formed on the other side of the metal strip 58 by the roll coater 51' on the right side in FIG. 10. The roll coater 51' operates similarly to the roll coater 51 except for operations in which the backup roller 56 is involved.

Figure 11:
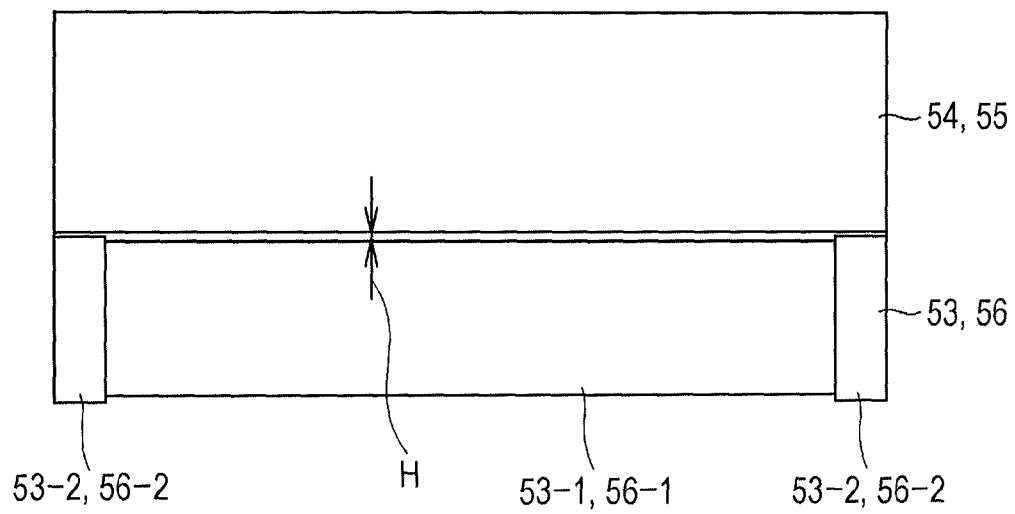
FIG. 11 illustrates the relationship among a material pickup roller, a metering roller, an applicator roller, and a backup roller of the roll coater illustrated in FIG. 10.

In order to precisely adjust the coating thickness of the coating layer formed on the metal strip 58 through continuous coating using such a roll coater 51, it is required that the precisions of gaps among the four rollers 53, 54, 55, and 56 as illustrated in FIG. 11 be maintained. Specifically, it is required that the precisions of the following gaps be maintained: a gap between the material pickup roller 53 (an example of the rotating body) and the metering roller 54 (an example of the opposing object), a gap between the material pickup roller 53 and the applicator roller 55, and the gap G' between the applicator roller 55 (an example of the opposing object) and the backup roller 56 (an example of the rotating body).

For this reason, the material pickup roller 53 and the backup roller 56 respectively have bearings 53-2 attached to ends of the sleeve 53-1, the ends being located in the axial direction, and bearings 56-2 attached to ends of the sleeve 56-1, the ends being located in the axial direction. The sleeves 53-1 and 56-1 (examples of the rotating member) each serve as the roller body and have a cylindrical shape. The bearings 53-2 each have an outer diameter slightly larger than that of the sleeve 53-1, and the bearings 56-2 each have an outer diameter slightly larger than that of the sleeve 56-1 (the bearings 53-2 and 56-2 have radii respectively larger than those of the sleeves 53-1 and 56-1 by a length corresponding to the size of the gap G'). Through contact of the bearings 53-2 and 56-2 with the metering roller 54 and the applicator roller 55 while the bearings 53-2 and 56-2, the metering roller 54, and the applicator roller 55 rotate, the sizes of the gaps G' are maintained between the sleeves and the rollers (more specifically, between the sleeve 53-1 and the metering roller 54, between the sleeve 53-1 and the applicator roller 55, and between the sleeve 56-1 and the applicator roller 55).

Figure 12:
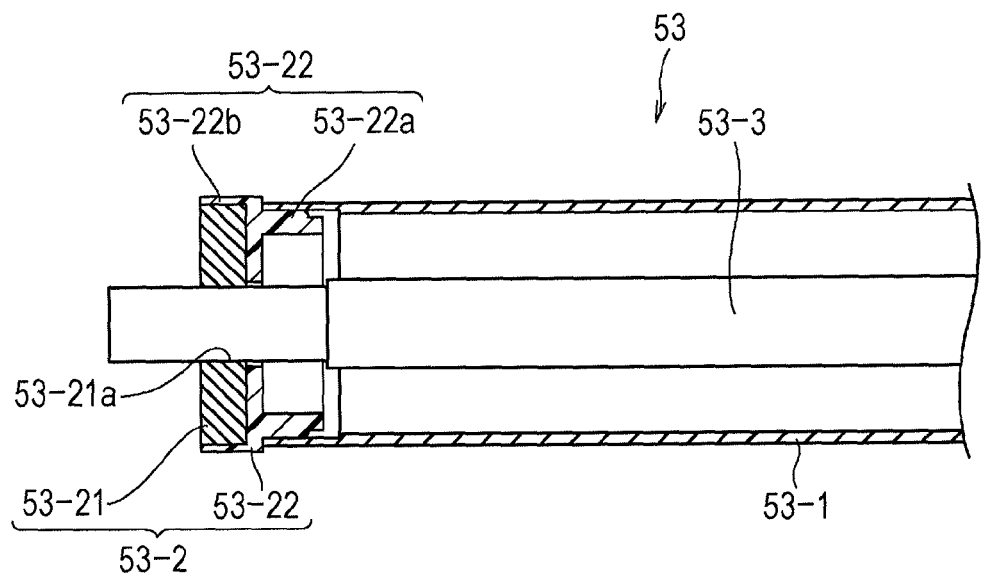
FIG. 12 is a sectional view of part of the material pickup roller provided in the roll coater illustrated in FIG. 10 taken in the axial direction.

The material pickup roller 53 and the backup roller 56 have a structure as illustrated in FIG. 12. The structure of the material pickup roller 53 and the structure of the backup roller 56 are similar to each other. Thus, the structure of the material pickup roller 53 is illustrated in FIG. 12, and the material pickup roller 53 will be described below.

As illustrated in FIG. 12, the material pickup roller 53 has the cylindrical sleeve 53-1, which serves as the roller body as described above, and a shaft 53-3 inserted through the sleeve 53-1. The aforementioned bearings 53-2 are each located at a corresponding end of the sleeve 53-1. The shaft 53-3 is rotatably held by the bearings 53-2.

As illustrated in FIG. 12, each bearing 53-2 has an annular inner ring portion 53-21 and an annular outer ring portion 53-22. The inner ring portion 53-21 is formed of a sintered metal material (made by compression-molding and heating copper, steel or other metal impalpable powder, so that metal particles are diffusion-bonded at a temperature equal to or lower than the melting point) and has a bearing hole 53-21a formed therein, which is located near the rotation center of the material pickup roller 53 and holds the shaft 53-3 such that the shaft 53-3 is rotatable relative to the bearing hole 53-21a. The outer ring portion 53-22 is formed of resin and located away from the rotation center of the material pickup roller 53. The inner ring portion 53-21 and the outer ring portion 53-22 are integrated with each other with the inner ring portion 53-21 insert-molded into the outer ring portion 53-22.

The inner ring portion 53-21 is not necessarily formed of a sintered metal material. It is sufficient that the inner ring portions 53-21 be made of metal. However, since use of a sintered metal material as the material of the inner ring portion 53-21 helps increase the dimensional precision of the inner ring portion 53-21, the inner ring portion 53-21 may be formed of a sintered metal material.

The outer ring portion 53-22 has a first portion 53-22a and a second portion 53-22b. The first portion 53-22a is fitted into the sleeve 53-1. The second portion 53-22b protrudes in the axial direction from the sleeve 53-1. As illustrated in FIG. 12, the second portion 53-22b surrounds an outer peripheral surface of the inner ring portion 53-21 and has an outer diameter larger than that of the sleeve 53-1. Here, the difference between the radii of the outer diameters of the second portion 53-22b and the sleeve 53-1 corresponds to the difference between the radius of the sleeve 53-1 and the aforementioned radius larger than the radius of the sleeve 53-1 by the size of the gap G'.

Thus, through contact of the second portions 53-22b of the material pickup roller 53 with the metering roller 54 and the applicator roller 55, which are the opposing objects that oppose the sleeve 53-1, the sleeve 53-1 and the metering roller 54, and the sleeve 53-1 and the applicator roller 55 are spaced apart from each other by a specified size of a gap.

In such a material pickup roller 53, the inner ring portion 53-21 is insert-molded into the outer ring portion 53-22, and the second portion 53-22b of the outer ring portion 53-22 surrounds the outer peripheral surface of the inner ring portion 53-21, which is formed of a sintered metal material having high dimensional precision. This may allow the thickness of the second portion 53-22b of the outer ring portion 53-22, which is formed of resin, to be decreased (for example, to 1 mm or smaller). Thus, most of the effects of depression that molded resin usually undergoes may be eliminated, and accordingly, highly precise dimensions may be maintained and changes in dimensions may be suppressed.

The outer ring portion 53-22 and the inner ring portion 53-21 are integrated with each other with the inner ring portion 53-21 insert-molded into the outer ring portion 53-22. This may suppress occurrence of a situation in which the outer ring portion 53-22 and the inner ring portion 53-21 slide on each other, resulting in wear of the outer ring portion 53-22. Accordingly, with the material pickup roller 53 according to the present exemplary embodiment as an example of the rotating body, the precisions of the gaps G' (see FIG. 11) between the material pickup roller 53 and the metering roller 54 as the opposing object and between the material pickup roller 53 and the applicator roller 55 as the opposing object are maintained.

In the foregoing description, the bearings 53-2 and the bearings 56-2 are provided in the material pickup roller 53 and the backup roller 56 as examples of the rotating body in order to adjust the gaps G'. Instead, bearings may be provided in the metering roller 54 and the applicator roller 55. Furthermore, bearings may be provided in all the rollers 53, 54, 55, and 56.

Although the invention developed by the inventor has been specifically described in accordance with the exemplary embodiments, the exemplary embodiments disclosed herein should be understood as exemplary in every point. The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents. The scope of the invention includes technologies equivalent to technologies described within the scope of the claims and all modifications without departing from the gist of the scope of the claims.

For example, in the foregoing description of the exemplary embodiments, the bearings 13a-2, 53-2, and 56-2 are provided at both the ends of the sleeves 13a-1, 53-1, and 56-1 serving as rotating members. According to the exemplary embodiments of the present invention, the bearings are not necessarily provided at both the ends of the rotating member. Instead, the bearing may be provided at one of the ends of the rotating member.

In the foregoing description of the exemplary embodiments, the inner ring portion 13a-21 and the outer ring portion 13a-22 are integrated with each other with the inner ring portion 13a-21 insert-molded into the outer ring portion 13a-22 and the inner ring portion 53-21 and the outer ring portion 53-22 are integrated with each other with the inner ring portion 53-21 insert-molded into the outer ring portion 53-22. However, the inner ring portion 13a-21 and the outer ring portion 13a-22 and inner ring portion 53-21 and the outer ring portion 53-22 may be integrated using a molding technique other than insert molding.

Furthermore, the thicknesses of the second portion 13a-22b of the outer ring portion 13a-22 and the second portion 53-22b of the outer ring portion 53-22 are not limited to 1 mm or smaller.

In the foregoing description, the rotating body and the bearing according to the exemplary embodiments of the present invention are applied to the developing roller of the image forming apparatus that records images with toner, and to the material pickup roller and the backup roller of the roll coater that continuously apply a coating material to the metal strip. However, the application of the rotating body and the bearing is not limited to these. The rotating body and the bearing may be applied to a variety of devices in which the precisions of gaps between the rotating bodies and the opposing objects are maintained.

What is claimed is:

1. A rotating body comprising:
   a cylindrical rotating member having ends in an axial direction of the rotating member; and
   a bearing located at one of the ends located in the axial direction,
   wherein the bearings includes
      a metal inner ring portion having an outer peripheral surface and a bearing hole formed in the inner ring portion; and
      a resin outer ring portion having a first portion and a second portion, the first portion being fitted into the rotating member, the second portion protruding in the axial direction from the rotating member, the second portion surrounding the outer peripheral surface of the inner ring portion, the second portion having an outer diameter larger than an outer diameter of the rotating member, and the second portion being configured to be in contact with an opposing object disposed opposite the rotating member so as to maintain a specified size of a gap, the rotating member and the opposing object being configured to be spaced from each other by the specified size of the gap, and
   wherein the resin outer ring portion and the metal inner ring portion are integrally molded, and wherein the cylindrical rotating member comprises a surface configured to hold a developer, and the outer diameter of the second portion of the resin outer ring portion is larger than the outer diameter of the cylindrical rotating member comprising the surface configured to hold the developer, and wherein an outer diameter of the metal inner ring portion is larger than an outer diameter of the first portion of the resin outer ring portion so that a thickness of the second portion of the resin outer ring portion is decreased to a size rendering negligible most of the changes in dimensions resulting from shrinkage occurring in the second portion of the resin outer ring portion so as to maintain highly precise dimensions of the bearing portion and, as a result, of the specifies size of the gap.

2. The rotating body according to claim 1,
   wherein the inner ring portion is formed of a sintered metal material.

3. The rotating body according to claim 1,
   wherein the rotating member is formed of an electrically conductive material, and
   wherein the outer ring portion is formed of electrically conductive resin.

4. The rotating body according to claim 3,
   wherein the inner ring portion is formed of a non-oil impregnated sintered metal material that is not impregnated with oil.

5. The rotating body of claim 1, wherein the opposing object that is to be in contact with the second portion is a photoconductor drum, and the size of the gap is specified such that when the photoconductor drum is in contact with the second portion, the developer held by the surface of the cylindrical rotating member by a magnetic force is attracted to the photoconductor drum by electrostatic force.

6. A bearing attachable to a cylindrical rotating member having ends in an axial direction of the rotating member, the bearing being attachable at one of the ends of the rotating member, the bearing comprising:
   a metal inner ring portion having an outer peripheral surface and a bearing hole formed in the inner ring portion; and
   a resin outer ring portion having a first portion and a second portion, the first portion being fitted into the rotating member as a target the first portion is attached to, the second portion protruding in the axial direction from the rotating member, the second portion surrounding the outer peripheral surface of the inner ring portion, the second portion having an outer diameter larger than an outer diameter of the rotating member, and the second portion being configured to be in contact with an opposing object disposed opposite the rotating member so as to maintain a specified size of a gap, the rotating member and the opposing object being configured to be spaced from each other by the specified size of the gap, and
   wherein the outer resin ring portion and the metal inner ring portion are integrally molded, and wherein the cylindrical rotating member comprises a surface configured to hold a developer and the outer diameter of the second portion of the resin outer ring is larger than the outer diameter of the cylindrical rotating member comprising the surface configured to hold the developer, and wherein an outer diameter of the metal ring portion is larger than an outer diameter of the first portion of the resin outer ring portion so that a thickness of the second portion of the resin outer ring portion is decreased to a size rending negligible most of the changes in dimensions resulting from shrinkage occurring in the second portion of the resin outer ring portion so as to maintain highly precise dimensions of the bearing portion and, as a result, of the specified size of the gap.

7. The rotating body according to claim 1, wherein the inner ring portion includes a side surface in the axial direction of the rotating member and the side surface includes a coupling portion.

8. The rotating body according to claim 7, wherein the coupling portion comprises a recessed hole connected to a coupling member.

9. The bearing of claim 6, wherein the opposing object that is to be in contact with the second portion is a photoconductor drum, and the size of the gap is specified such that when the photoconductor drum is in contact with the second portion, the developer held by the surface of the cylindrical rotating member by a magnetic force is attracted to the photoconductor drum by electrostatic force.

10. A developing roller comprising:
    a cylindrical rotating member having ends in an axial direction of the rotating member;

a bearing located at one of the ends located in the axial direction; and
a cylindrical magnet disposed in an inner side of the cylindrical rotating member,
wherein the bearing includes
  a metal inner ring portion having an outer peripheral surface and a bearing hole formed in the inner ring portion; and
  a resin outer ring portion having a first portion and a second portion, the first portion being fitted into the rotating member, the second portion protruding in the axial direction from the rotating member, the second portion surrounding the outer peripheral surface of the inner ring portion, the second portion having an outer diameter larger than an outer diameter of the rotating member, and the second portion being configured to be in contact with an opposing object disposed opposite the rotating member so as to maintain a specified size of a gap, the rotating member and the opposing object being configured to be spaced from each other by the specified size of the gap, and
wherein the resin outer ring portion and the metal inner ring portion are integrally molded, and wherein the cylindrical rotating member comprises a surface configured to hold a developer, and the outer diameter of the second portion of the resin outer ring portion is larger than the outer diameter of the cylindrical rotating member comprising the surface configured to hold the developer, and wherein an outer diameter of the metal inner ring portion is larger than an outer diameter of the first portion of the resin outer ring portion so that a thickness of the second portion of the resin outer ring portion is decreased to a size rendering negligible most of the changes in dimensions resulting from shrinkage occurring in the second portion of the resin outer ring portion so as to maintain highly precise dimensions of the bearing portion and, as a result, of the specified size of the gap.

11. The developing roller of claim 10, wherein the opposing object that is to be in contact with the second portion is a photoconductor drum, and the size of the gap is specified such that when the photoconductor drum is in contact with the second portion, the developer held by the surface of the cylindrical rotating member by a magnetic force is attracted to the photoconductor drum by electrostatic force.

* * * * *